United States Patent [19]

Gilbertson et al.

[11] 4,311,291
[45] Jan. 19, 1982

[54] NOZZLE STRUCTURE WITH NOTCHES

[75] Inventors: Frederick L. Gilbertson; Douglas B. Garland; Donald C. Whittley, all of Toronto, Canada

[73] Assignee: The De Havilland Aircraft of Canada, Limited, Downsview, Canada

[21] Appl. No.: 968,226

[22] Filed: Dec. 11, 1978

[30] Foreign Application Priority Data

Nov. 22, 1978 [CA] Canada ................................ 316697

[51] Int. Cl.$^3$ .............................................. B64C 21/04
[52] U.S. Cl. .............................. 244/211; 239/265.19; 239/566; 239/601; 239/DIG. 7; 244/216
[58] Field of Search ...................... 239/265.11, 265.17, 239/265.19, 265.27, 422, 424.5, 425.5, 553.5, 556, 557, 565, 566–568, 597, 601, DIG. 7; 417/151, 179, 198; 244/204, 207, 210, 211, 216, 217; 181/213, 221, 224, 236, 239, 240; 60/269, 271

[56] References Cited

U.S. PATENT DOCUMENTS

| | | | |
|---|---|---|---|
| 63,595 | 4/1867 | Wilmot | 417/179 |
| 1,015,822 | 1/1912 | Mueller | 417/179 X |
| 1,150,473 | 8/1915 | Wiseley | 417/151 |
| 1,726,152 | 8/1929 | Kiesel, Jr. | 417/198 X |
| 2,844,337 | 7/1958 | MacArthur et al. | 244/207 |
| 2,914,916 | 12/1959 | Gelin et al. | 239/265.17 X |
| 3,460,763 | 8/1969 | Kopp | 239/265.27 X |
| 3,584,792 | 6/1971 | Johnson | 239/568 X |
| 3,743,185 | 7/1973 | FFowles-Williams et al. | 181/221 X |
| 3,834,834 | 9/1974 | Quinn | 417/198 X |

*Primary Examiner*—Andres Kashnikow
*Attorney, Agent, or Firm*—Rogers, Bereskin & Parr

[57] ABSTRACT

A nozzle for a jet stream in which the rear edge of the nozzle has a number of notches spaced therealong to widen the jet stream while directing the jet stream rearwardly of the nozzle. Each notch has a narrow front apex and a rear opening substantially wider than the apex, and each notch widens substantially smoothly and progressively from its apex to its rear opening, each notch having sides which at least over a major portion of their length diverge from each other at an angle of at least 60 degrees, and preferably at least 90 degrees. The nozzle will commonly blow into a diffuser to provide thrust augmentation but may also be used simply to blow over a flap, or it may be used without any diffusers or flaps, simply to provide noise reduction. So long as the notch divergence angle is wide enough, loss of nozzle efficiency is minimized, and when a diffuser is used, thrust augmentation is increased. In another embodiment, fairings are placed between the notches to guide and confine the flow to the notches, permitting a large reduction in the notch angle.

24 Claims, 32 Drawing Figures

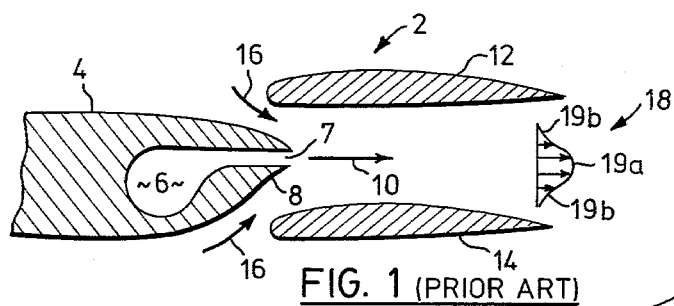
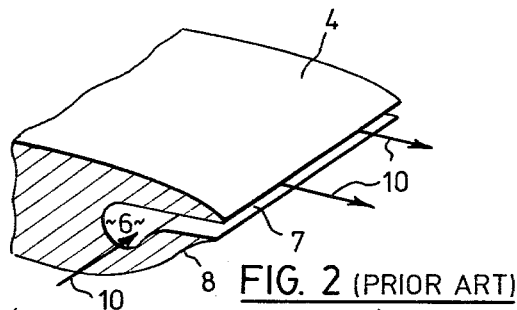
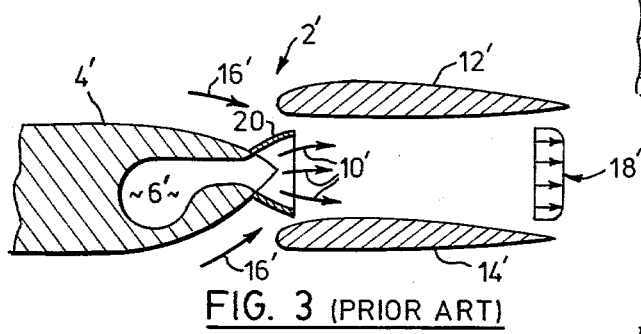
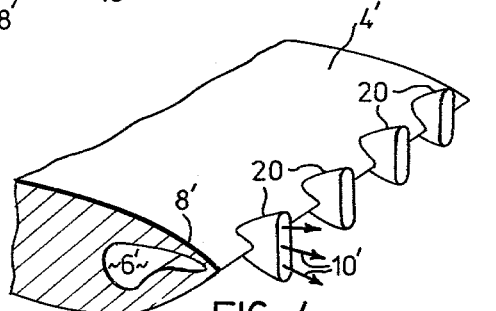
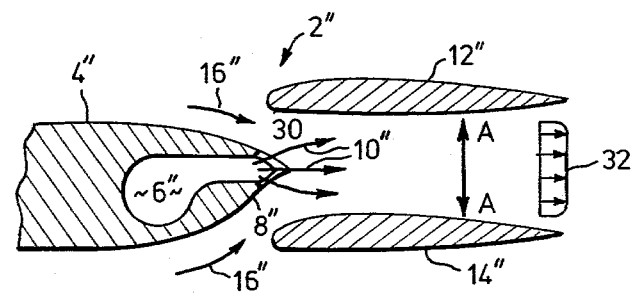
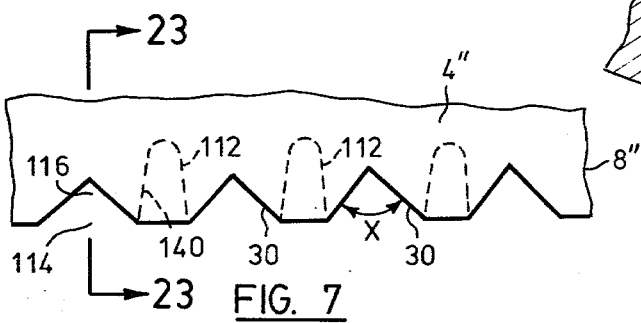
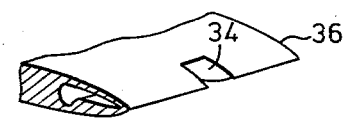
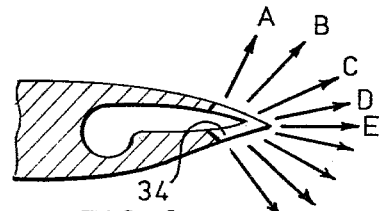
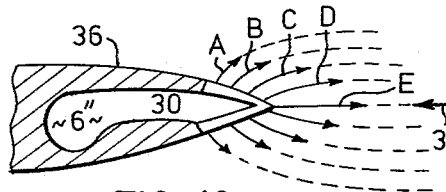
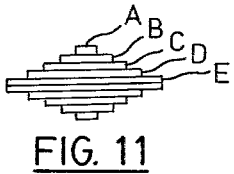

NOZZLE STRUCTURE WITH NOTCHES

This invention relates to improvements in jet nozzles.

Jet nozzles are commonly used for powered lift aircraft, for the blown wings or flaps of such aircraft. Such nozzles usually take the form of a slot, and may discharge into a diffuser which has an entrance opening near the nozzle into which additional air may be drawn. In such a case the additional air mixes in the diffuser with the jet stream from the nozzle and increases the thrust produced. The combination of the nozzle and diffuser is commonly called an ejector.

A disadvantage of previous slotted jet nozzles used in ejectors has been that the jet stream emerging from the slot does not spread uniformly across the height of the diffuser, and therefore the entrainment and mixing of additional air have not been optimized. In an attempt to solve this disadvantage, slotted nozzles have been built in which the normal linearly extending slot at the end of the nozzle has been changed to a series of vertically segmented nozzles having flared ends spaced closely together. This spreads the jet stream more uniformly across the diffuser in a direction normal to the plane of the jet stream and improves the entrainment and mixing of additional air. However, although this provides a substantial increase in overall thrust as compared with a plain slotted nozzle, the structure constituted by the large number of vertically segmented nozzles adds to the manufacturing cost and weight of the aircraft. More significantly, the flared ends of the nozzles cause considerable loss of efficiency due to air resistance.

Accordingly, the invention in one of its aspects provides a nozzle arrangement for spreading the jet stream more uniformly across the throat of the diffuser. According to this aspect of the invention, the rear edge of the nozzle has a series of notches spaced therealong. Each notch has a narrow front apex, a rear opening substantially wider than its apex, and each notch widens substantially smoothly and progressively from its apex to its rear opening. The sides of the notch diverge from each other at an angle which, at least over a major portion of the length of the sides, exceeds 60 degrees and preferably exceeds 90 degrees. It is found that these notches, particularly those in which the angle of divergence of the sides exceeds 90 degrees, can produce thrust augmentation greater than that which has been achieved with vertically segmented nozzles, and at greatly reduced weight and cost.

The notch system according to the invention may also be used in ejectors having circular jet nozzles, and with nozzles which are used simply for blowing over flaps without diffusers.

It is also common practice to form the circular nozzles of jet engines in a complex shape, for example with indented fingers, to deploy the jet in a manner which reduces noise. In some cases slots in the circular nozzles have been used for this purpose, for example as shown in U.S. Pat. No. 3,743,185. Unfortunately, both the indented fingers and the slots employed have resulted in considerable loss of thrust of the nozzle. U.S. Pat. No. 3,743,185 indicates that a five percent loss in thrust is suffered for a ten PNdB noise reduction. This thrust loss can be reduced by use of the notches of the invention, placed around the periphery of the jet nozzle. Not only is the thrust loss reduced in this way, but at the same time noise reduction is achieved.

It is found that the controlled spreading of the jet which is achieved by using notches having a divergence angle of 60 degrees or more can also be achieved by using notches having a much narrower angle of divergence (as low as zero degrees) provided that internal fairing structure is placed between the notches, to guide and confine the flow of gas to the notches. Therefore in another aspect the invention provides a nozzle system for a jet stream comprising: nozzle structure having a rear edge, a plurality of nozzles spaced along said rear edge, each nozzle having a tapered rear end and a notch in said rear end, each notch having a front apex and a rear opening wider than said apex, each notch widening smoothly and progressively from said apex to said rear opening, gas supply means within said structure for conducting pressurized gas to said nozzles, and fairing means within said structure separating said notches from each other, for guiding gas from said gas supply means to said notches, and for confining the flow of gas to said notches, for said nozzles to spread said jet stream while presenting a low resistance to gas flowing over said nozzle structure.

Further objects and advantages of the invention will appear from the following description, taken together with the accompanying drawings, in which:

FIG. 1 is a cross-sectional view showing a prior art ejector;

FIG. 2 is a perspective view showing the nozzle portion of the ejector of FIG. 1;

FIG. 3 is a cross-sectional view showing a further prior art ejector;

FIG. 4 is a perspective view showing the nozzle portion of the ejector of FIG. 3;

FIG. 5 is a cross-sectional view showing an ejector according to the invention;

FIG. 6 is a perspective view showing the nozzle portion of the ejector of FIG. 5;

FIG. 7 is a top view of the ejector portion of FIG. 6;

FIG. 8 is a cross-sectional view showing diagrammatically the operation of a rectangular notch;

FIG. 9 is a perspective view showing the rectangular notch the operation of which is illustrated in FIG. 8;

FIG. 10 is a cross-sectional view showing diagrammatically the operation of a divergent notch of the invention;

FIG. 11 is an end view illustrating in idealized fashion the gaseous elements emerging from the FIG. 10 notch;

Figure 12:
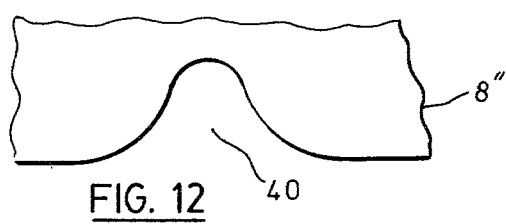
FIG. 12 is a top view showing a modified notch of the invention.

Reference is first made to FIGS. 1 and 2, which show a standard ejector 2 currently used in many aircraft. Such an ejector is for example shown in U.S. Pat. Nos. 3,259,340 and 3,442,470, both issued to The DeHavilland Aircraft of Canada; U.S. Pat. No. 3,841,588 issued to The Boeing Company, and U.S. Pat. No. 3,860,200 issued to Rockwell International Corporation.

The ejector 2 shown in FIG. 1 may be incorporated into the wing 4 of an aircraft. The wing 4 has a duct 6 extending spanwise therealong, the duct 6 being pressurized with air or other fluid from the aircraft engine or engines, by means not shown. The air from the duct 6 is blown outwardly through a rectangular slot 7 at the end of a nozzle 8, the path of the air being indicated by arrows 10. The air travels rearwardly between upper and lower flaps 12, 14, which together form a diffuser, and exits from the rear opening between the flaps. The flaps 12, 14 are pivotally fixed to the wing 4 by hinge structure which is not shown but which may be the same for example as that shown in U.S. Pat. No. 3,442,470.

As the blown air indicated by arrows 10 travels between the upper and lower flaps, it entrains secondary or additional air, indicated by arrows 16. The secondary air mixes with the primary air blown out the nozzle 8, increasing the mass of the air which is blown out the rear of the ejector 2. This increases or augments the thrust of the nozzle 8.

Unfortunately, the total pressure distribution at the rear of the flaps 12, 14 (which pressure distribution is indicated by graph 18 in FIG. 1) has a pressure peak 19a midway between the flaps, and the pressure falls off to very low values 19b at the top and bottom of the diffuser, i.e. near the flaps. This reduced pressure at the edges of the diffuser is extremely undesirable, because it results in inefficient entrainment of secondary air and inefficient interchange of momentum.

To deal with this problem, the prior art has adopted the solution shown in FIGS. 3 and 4. In FIGS. 3 and 4, in which primed reference numerals indicate parts corresponding to those of FIGS. 1 and 2, the slot 7 at the rear end of the nozzle 8' has been closed and replaced by a series of vertically segmented nozzles 20 spaced fairly closely together along the rear edge of the nozzle 8'. The nozzles 20 are flared to direct the jet flow from the duct 6' more closely to the opposed inner surfaces of the flaps 12', 14'. This results in a pressure distribution which is much more uniform across the distance separating flaps 12', 14', the improved pressure distribution being indicated by graph 18' in FIG. 3. The nozzles 20 are placed sufficiently closely together that the jet streams issuing therefrom merge laterally and produce a relatively uniform pressure distribution lengthwise between the flaps 12', 14'.

Tests have indicated that the use of flared segmented nozzles can produce fairly substantial improvements in thrust augmentation. For example, in one test which was conducted, the augmentation ratio of apparatus such as that shown in FIG. 1 was 1.38, i.e. the thrust produced was 1.38 times that which would have been produced had the mass flow directed through nozzle 8 been directed instead through a simple ideal nozzle. When the apparatus shown in FIGS. 3 and 4 was used instead, the augmentation ratio increased considerably; in one test, it increased to 1.57.

Unfortunately, as previously indicated, the projection of the flared segmented nozzles 20 into the airstream creates considerable losses due to friction. The nozzles 20 also of course add weight to the aircraft. The inventors have discovered that a similar effect as that produced by the nozzles 20 can be achieved (and in fact in some respects even a better performance can be achieved) by replacing the nozzles 20 with simple notches formed in the trailing edge of nozzle 8. An example of this system is shown in FIGS. 5 to 7, in which double prime reference numerals indicate parts corresponding to those of FIGS. 1 and 2.

In the FIGS. 5 to 7 structure, the slot 7 at the rear edge of the nozzle has been closed, as in the FIGS. 3 and 4 structure, and the segmented nozzles 20 have been replaced by triangular notches 30. The notches 30 are spaced along the trailing edge of the nozzle 8" in the same positions as the segmented nozzles 20 so that the jet streams emerging therefrom will merge laterally and produce fairly uniform pressure distribution lengthwise of the ejector structure. At the same time the notches ensure a high degree of uniformity of pressure distribution across the depth of the ejector (i.e. in the direction of arrow A—A).

It is found that the notches 30 can perform as well as, or better than, the segmented nozzles 20 in producing a uniform pressure distribution across the depth of the ejector. A typical pressure distribution which may be achieved is indicated by graph 32 in FIG. 5. However, to achieve good results in the FIGS. 5 to 7 structure described, the angle x (FIG. 7) between the sides of each notch 30 should be relatively wide. It is found that angle x should be at least 60 degrees and is preferably substantially more, for example 90 degrees or more. In fact, preferably angle x is about 100 degrees and can be even greater if desired. Angle x will normally not exceed about 145 degrees, however, except in special circumstances. The preferred range for Angle x is 90 to 120 degrees.

The physical mechanism by which the notches 30 operate is illustrated diagrammatically and in simplified manner in FIGS. 8, 9, and 10. FIG. 8 illustrates, with arrows marked A, B, C, D, E, the manner in which a jet stream will issue from a rectangular notch 34 (FIG. 9) in the end of a nozzle 36. Each arrow A to E represents an element of the jet stream. As shown, when each element is of equal size, then each element will continue to discharge substantially in the direction from which it issues from the notch 34 in FIG. 9, and too much spreading of the jet stream will be produced. The very wide spreading results in a substantial reduction of efficiency of the nozzle and also degrades the performance of the ejector in entraining secondary air.

However, if the diverging notch 30 of FIGS. 4 to 6 is used in place of the rectangular notch 34, then a different result occurs, as shown in FIG. 10. Since jet element "A" is now adjacent to a jet element "B" which is discharging at a lesser angle to the centre plane 38 of the nozzle and which is substantially larger, element "A" will now tend to bend downstream and follow the direction of element "B". This occurs by virtue of the Coanda effect. Since the largest element is element E which discharges parallel to the plane 38 of the nozzle, the result is that the elements A to D all bend downstream and tend to follow a direction parallel to the centre plane 38, as indicated by the dotted lines in FIG. 10. However, as shown in FIGS. 9 and 10, the jet is substantially spread at a location near the exit of the nozzle 8" and thus produces a more uniform pressure distribution across the depth of the ejector 2". This extent of the spreading can be controlled by adjusting the length (in a front to rear direction) of the notches, as well as by controlling their angle of divergence. A 60 degree angle of divergence will produce a "taller" spread than will a 145 degree angle of divergence. It is undesirable for the jet from the nozzle to be spread so much that it hits the diffusers 12", 14", since this increases losses, and therefore the actual angle of the divergence will vary with the application.

In the same set of tests as that discussed previously, in which an augmentation ratio of 1.38 was achieved with the FIG. 1 apparatus and an augmentation of 1.57 was achieved with the FIG. 3 apparatus, the apparatus of FIGS. 5 to 7 achieved an augmentation ratio of 1.68, while at the same time eliminating the need for the flared segmented nozzles 20. One of the factors in the improved performance of the FIGS. 5 to 7 apparatus as compared with that of FIGS. 3 and 4 is thought to be that the drag of the flared nozzles 20 in the very high velocity gas streams in the throat of the ejector 2' has been eliminated.

It will be appreciated that various forms may be selected for the notches 30. For example, the notches need not be exactly triangular; the apex of each notch may be curved and the sides may be non-linear, as shown for notch 40 in FIG. 12. In all cases, however, the sides of the notch at least over most of the length of the notch should diverge smoothly and progressively and the angle of divergence should be at least 60 degrees, and preferably at least 90 degrees. As indicated, a divergence angle of approximately 100 degrees has been found to produce excellent results.

Figure 13:
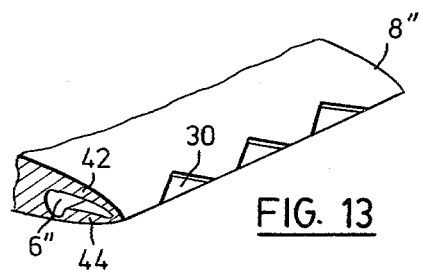
FIG. 13 is a perspective view showing notches formed in one side only of a nozzle.
Figure 14:
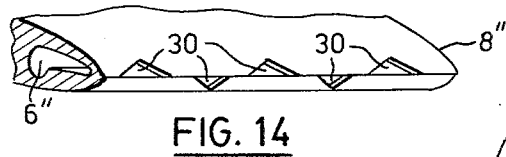
FIG. 14 is a perspective view showing notches arranged in staggered fashion in a nozzle.

Although the notches 30 have been shown as cut through both surfaces bounding the nozzle 8", the notches 30 may instead be cut through one such surface 42 (FIG. 13) only, and not through the other surface 44 (depending upon the ejector configuration used). Alternatively, or in addition, the notches 30 may be staggered by placing them alternately in surfaces 42, 44, as shown in FIG. 14.

Figure 15:
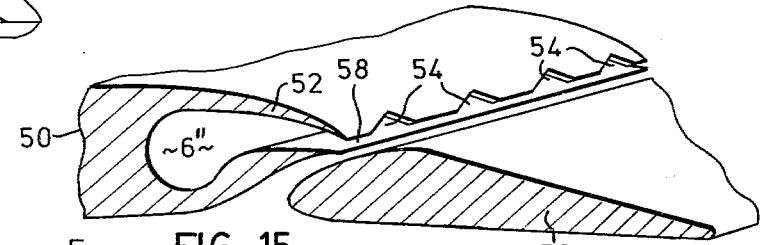
FIG. 15 is a perspective view showing notches arranged in one side of a nozzle and flap system.

It will also be appreciated that the notches 30 may be used in conjunction with only one flap, such as either flap 12 or flap 14. Such an arrangement is shown in FIG. 15, in which the aircraft wing is indicated at 50, the nozzle at 52, a diverging notch (like notch 30) at 54, and the single flap (which may be a landing flap) at 56. This arrangement, except for the notches 54, is similar to that shown in U.S. Pat. No. 3,161,377. The FIG. 15 arrangement also illustrates that the trailing end of the nozzle 52 need not be fully closed when the diverging notches of the invention are used, but can if desired be provided with a narrow slot 58. The slot 58 will usually be somewhat narrower than that of the slot which would have been used if the notches 54 were not present, so that the total area of the slot 58 plus the notches 54 is of the same order as that of the slot which would have been used if notches 54 were not present. In the FIG. 15 version, the notches 54 are located only in the upper rear edge of the nozzle 52, since no spreading of the jet stream in a downward direction would usually be required in this arrangement.

Figure 16:
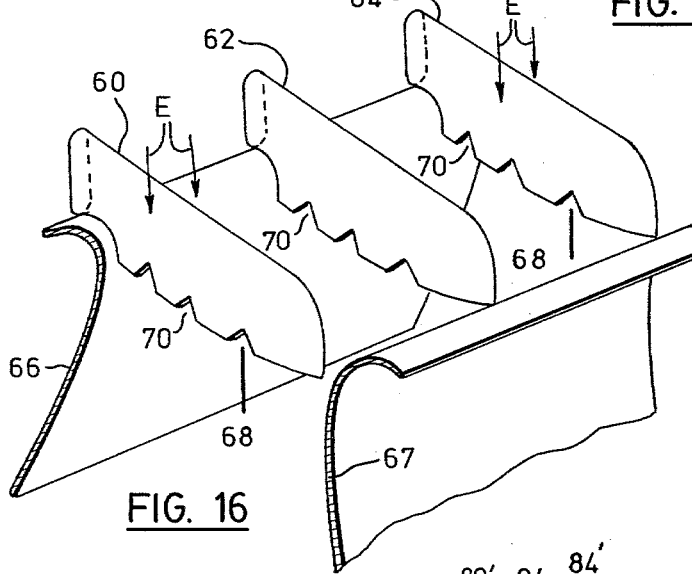
FIG. 16 is a perspective view showing a notched nozzle system for use in a VTOL aircraft.
Figure 17:
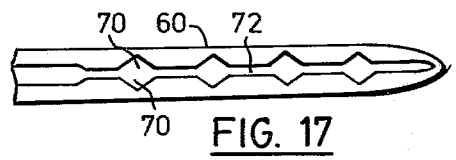
FIG. 17 is a plan view of the bottom of a modified nozzle for the FIG. 16 system.

Another application of the slots is shown in FIG. 16. FIG. 16 shows a typical high performance ejector configuration for a VTOL aircraft. In this configuration, a jet stream from the engines (not shown) is blown through nozzles 60, 62, 64, and downwardly between flaps 66, 67, as indicated by arrows 68. Secondary air is inducted from above the nozzles, as indicated by arrows E, and is entrained in jet streams. The nozzles 60, 62, 64 and provided with diverging notches 70 of the design described which may be staggered with respect to each other so that the "fingers" of the jets which issue from the slots interlace with one another. If desired, the trailing ends of the nozzles 60, 62, 64 may be closed except for the notches, as previously described. Alternatively, as shown in FIG. 17, the nozzles 60, 62, 64 may have a narrow rectangular slot 72 in their trailing ends, with the diverging notches 70 located in the edges of the surfaces bounding the slot 72. This may provide less spreading of the jet stream than would occur if the slot 22 were closed, but the combination may be desirable under some circumstances. The extent of the spreading may be adjusted by controlling the width of the slot 72 and the number, spacing, front to rear length, and divergence of the notches 70. It will be appreciated that in the FIGS. 5 to 7 and FIGS. 13 and 14 embodiments of the invention, a narrow rear slot in the end of the nozzle may also be provided, in addition to the divergent notches of the invention.

Figure 18:
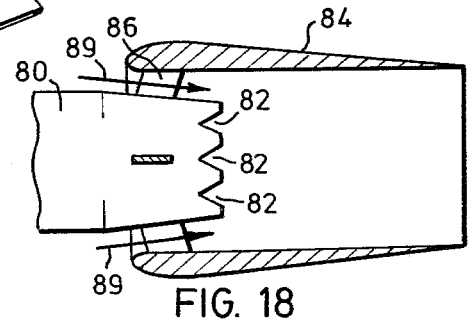
FIG. 18 is a side view of a circular jet nozzle having notches according to the invention, in combination with an annular shroud.
Figure 19:
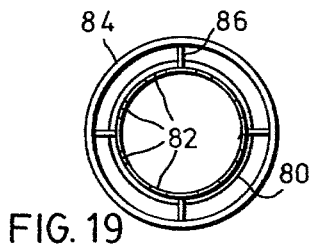
FIG. 19 is an end view of the nozzle of FIG. 18.
Figure 18A:
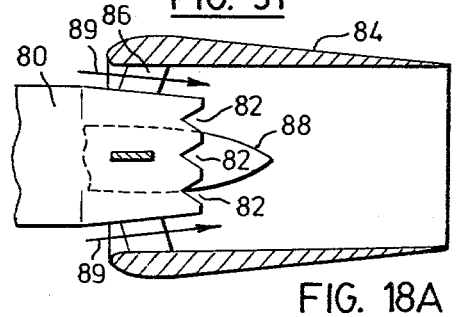
FIG. 18A is a side view similar to FIG. 18 but showing a central body in the jet nozzle.

The notched nozzle of the invention may also be used with a cylindrical jet nozzle, as indicated in FIGS. 18, 18A and 19. FIGS. 18, 18A and 19 show a cylindrical jet nozzle 80 having a series of diverging notches 82 of the design described, spaced around its circular trailing edge. A cylindrical diffuser 84 is fixed to the jet nozzle, by struts indicated at 86, to produce thrust augmentation. The jet nozzle 80 may in some cases contain a bullet-shaped centre body indicated at 88 in FIG. 18A, in which case the nozzle will be annular. The body 88 may be the fairing end of the shaft of a turbine (not shown), or it may simply be a movable body used to adjust the size of the exit area of the jet nozzle 80.

Figure 20:
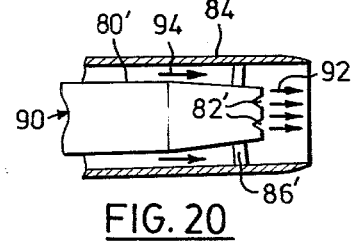
FIG. 20 is a side view similar to FIG. 18 but showing a turbo fan engine.

In the FIG. 18 structure the flow indicated by arrows 89 may be ordinary secondary air or may alternatively be another propulsive stream, such as bypass air in the case of a turbofan engine. FIG. 20, where primed reference numerals indicate parts corresponding to those of FIGS. 18 and 19, shows this latter arrangement. FIG. 20 shows the jet nozzle 80' of a turbofan engine 90 with a cylindrical shroud 84' encircling the nozzle 80'. In the turbofan engine 90 there is a central core 92 of high velocity hot gas and an outer annular sheath 94 of lower velocity cooler gas. It is found that maximum thrust is obtained by mixing the two streams 92, 94 to achieve more uniformity with regard to velocity and temperature. This function is carried out by the notches 82', without the need for costly heavy mixing hardware which has been used in the past.

It will also be appreciated that nozzles such as those shown in FIGS. 5 to 7, 13 to 15, 18 and 19 may be used without any diffusers. In that event there will be no thrust augmentation, but the notches will reduce the noise produced by the jet stream issuing from the nozzle, while degrading the nozzle efficiency less than would notches having a narrower angle of divergence. It is found that use of notches having a divergence angle of about 100 degrees results in a nozzle efficiency loss of only between 1.5 and 2 percent, as contrasted with the 5 percent or greater loss experienced with prior slots placed in nozzles.

Figure 21:
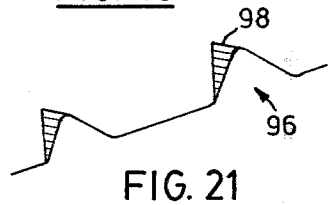
FIG. 21 is a diagrammatic view showing a modified notch of the invention.

Reference is next made to FIG. 21, which shows diagrammatically one side of a notch 96 which corresponds for example to notch 30 of FIG. 6. In the FIG. 21 embodiment, the edges 98 of the notch 96 are slightly outwardly curved or bulged, to help guide the gaseous elements in an inward direction. The curved edges 98 reduce the amount by which for example element A (FIG. 10) must be bent and therefore help to improve the efficiency of the nozzle. The extent of the curvature of edges 98 will be limited so that fabrication of separate elements will not be needed and so that there are no large obstructions projecting into the gas stream to increase frictional losses. The notch angle will then be at least 60 degrees, as viewed in plan. The edges of any of the notches shown in the previous embodiment of the inventor may also be slightly bulged, if desired.

Figure 22:
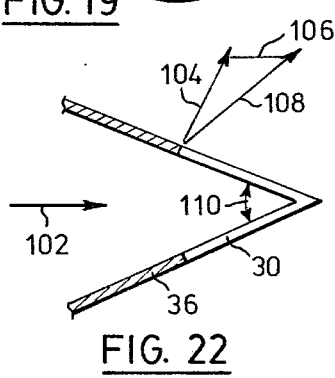
FIG. 22 is a cross-sectional diagrammatic view showing vectors representing gas flows.

The only factor which has been discussed so far as limiting the spreading of the jet by the notches is the Coanda effect. However, the extent of the spreading is controlled not only by the Coanda effect but also by other factors. Reference is made to FIG. 22, which is similar to FIG. 10 and shows notch 30 in nozzle 36. The stream of gas flowing toward notch 30 is indicated by arrow 102. Vector 104 indicates the direction in which an element of gas would tend to issue from notch 30 in the absence of the Coanda effect and in the absence of gas movement in the direction of arrow 102. Vector 106 represents the component of movement of the gas due to its velocity in the direction of arrow 102, and vector 108 is the resultant of vectors 104 and 106.

Figure 23:
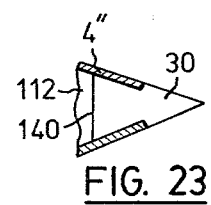
FIG. 23 is a cross-sectional view along lines 23—23 of FIG. 7 showing a fairing used to guide gas flows.
Figure 24:
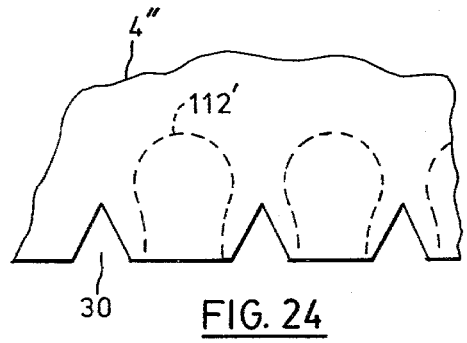
FIG. 24 is a top view similar to that of FIG. 7 but showing a modified form of internal fairings.
Figure 25:
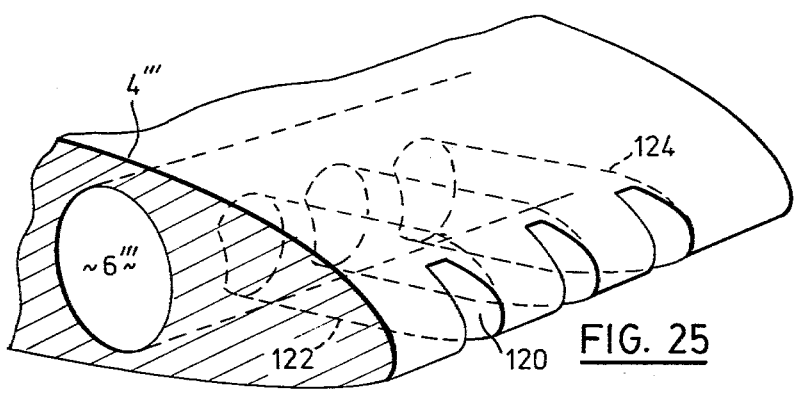
FIG. 25 is a perspective view similar to that of FIG. 6 but showing a modified nozzle structure.
Figure 29:
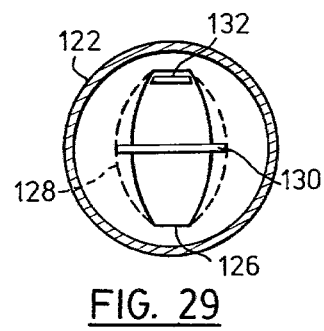
FIG. 29 is a sectional view taken along lines 29—29 of FIG. 27.
Figure 26:
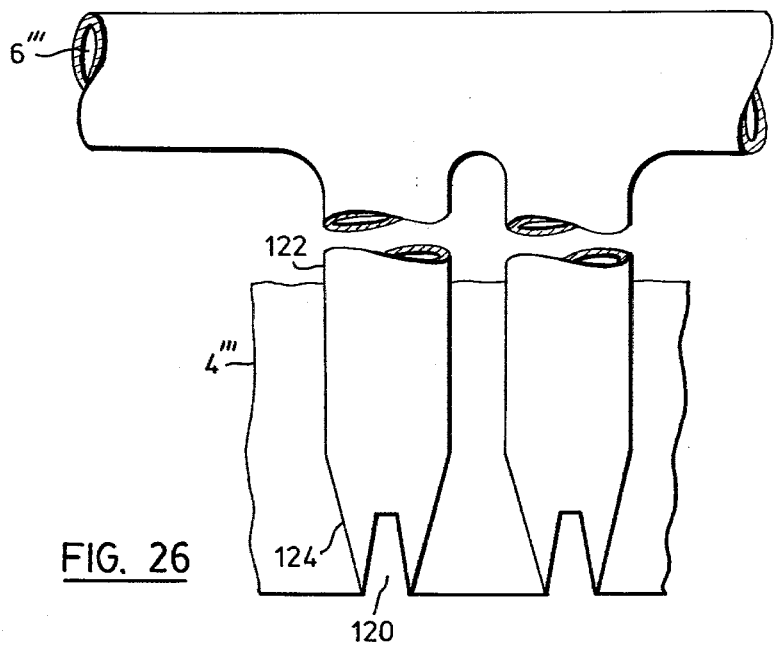
FIG. 26 is a top view, partly cut away, of a portion of the nozzle structure of FIG. 25.

It will be seen that vector 108 more closely approaches the direction of arrow 102 as the wedge angle 110 increases and as the velocity vector 106 increases. The extent to which the wedge angle 110 can be increased is obviously limited, but the velocity vector 106 can be increased by the use of internal fairings, which are shown in dotted lines at 112 in FIGS. 6 and 7 and are also shown in FIG. 23. The fairings 112 are simply curved light small strips set into the nozzle 8" between the notches 30. The fairings 112 guide the gas flow smoothly to the notches 30 and increase the nozzle efficiency by reducing internal losses. In addition with reference to FIG. 7, it will be appreciated that the gas velocity is normally the highest where the gas stream is "squeezed" the most. In the absence of the fairings 112, the velocity of the gas in the direction of arrow 102 is normally higher at point 114 than upstream at point 116. The fairings 112 serve not only to direct the flow but also to confine it as it approaches the notches 30. Therefore the fairings 112 increase the velocity of the flow at point 116, thus increasing the size of velocity vector 106. This causes the initial direction of the vector 108 representing an emerging gas element near the apex of notch 30 to be more closely aligned with the direction 102 of the gas flow into the notch 30. Less bending over by the Coanda effect of the gas element represented by vector 108 is therefore required. Since a smaller Coanda effect is needed, the divergence angle of the notch 30 can be less than that indicated previously. If the gas flow is squeezed sufficiently, for example by means of lobed internal fairings 112' as shown in FIG. 24, then the increase in velocity at point 116 (FIG. 7) can be very substantial as compared with the velocity in the absence of any internal fairings. The notch angle x can then be substantially reduced and yet the total height of the jet plume emerging from the notch 30 will still be limited to the desired dimension. With appropriate internal fairings 112 or 112', it is found that a given limited plume height which previously required a 90° notch angle to achieve (i.e. a lesser angle would have resulted in an unduly tall plume) can now be achieved with a notch angle of only approximately 30°.

Reference is next made to FIGS. 25 to 29, which show another embodiment of the invention. In the FIGS. 25 to 29 embodiment a duct 6''' located in a wing 4''' carries pressurized gas to notches 120 located at the rear edge of the wing. The gas is carried to the notches 120 by cylindrical ducts 122, each of which has a tapered tip 124. The tapered tip 124 contains the notch 120. As seen from above, the notch 120 has a straight front edge 126 oriented at right angles to the direction of flow, and sides 128 which diverge at a narrow angle x' from each other. In the example shown, angle x' is approximately 27°. As viewed from the end, the sides 128 of the notch 120 are curved or bulged outwardly, so that the notch 120 has a generally elliptical shape as viewed from the end, being wider at its centre than at its top and bottom. The widened centre permits an increased flow of gas to travel outwardly from along the mid plane of the notch (as represented diagrammatically by gas element 130) compared with the volume of gas exiting at the top and bottom of the notch (as represented diagrammatically by gas element 132). This enhances the Coanda effect, thereby limiting the height of the gas plume as desired. It is found that the notch angle of about 27 degrees used in FIGS. 25 to 29 embodiment is approximately equivalent to a notch angle of 90 degrees used in FIGS. 5 to 7 embodiment without fairings, i.e. the 27 degree notch with the ducts shown will produce approximately the same plume height as a 90 degree notch without fairings. However, the efficiency of the FIGS. 25 to 29 embodiment is greater than that of the FIGS. 5 to 7 embodiment since the internal losses are lower, because the gases are more smoothly guided to the notches in the FIGS. 25 to 29 embodiment. In general, it is found that when fairing structure is used, such as that constituted by ducts 122 or by fairings 112, 112', then the notch angle can be about 60 degrees less than the notch angle needed to produce the same degree of spreading without such fairing structure. For example, when the fairing structure is used, notches having a zero notch angle (i.e. U-shaped notches) will provide approximately the same degree of spreading as notches having a 60° notch angle, without fairings. In general a notch angle of at least 25° is preferred when fairings are used; but this will depend on the application and as indicated, a U-shaped notch (zero notch angle) can be used with fairings, in some applications.

The internal fairings 112, 112' are relatively simple to fabricate and add little weight, since they can be small, light strips. If desired, the trailing edges of the fairings 112 can be removed at point 140 (FIG. 23), and this will have only a very small effect on efficiency. The ducts 122 shown in FIGS. 25 to 29 effectively constitute internal fairings but add more weight and are more expensive to fabricate than the internal fairings 112. However, use of the ducts 122 has the advantage that it eliminates the need to pressurize a flat plate structure, so that the remainder of the nozzle structure can be made considerably lighter. In addition the internal efficiency of the FIGS. 25 to 29 structure is higher since the gas flows are better guided. At the same time, the flared nozzle structure 20 shown in FIG. 4 has been eliminated, thus eliminating not only considerable weight and manufacturing expense, but also the substantial friction losses which occur due to the drag of the flared nozzle 20 in the high velocity gas streams which are present.

Figure 30:
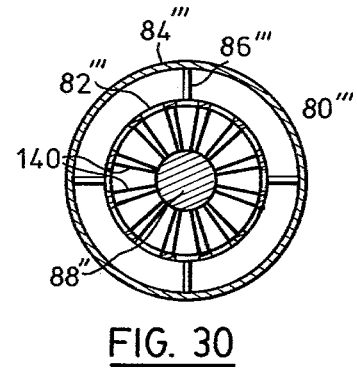
FIG. 30 is an end sectional view similar to FIG. 18 but showing internal fairings.
Figure 27:
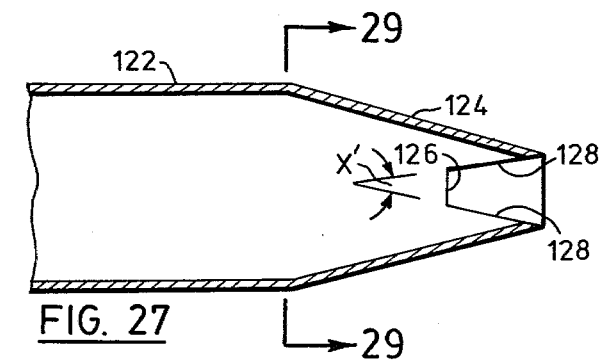
FIG. 27 is a top view of a nozzle duct of the FIG. 25 nozzle structure.
Figure 31:
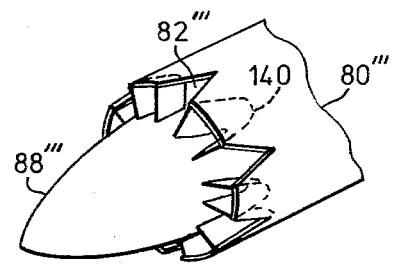
FIG. 31 is a perspective view of a portion of the structure of FIG. 30.
Figure 28:
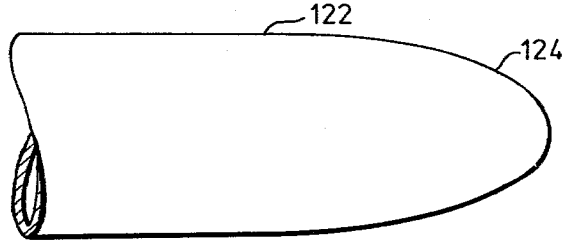
FIG. 28 is a side view of the duct of FIG. 27.

The same internal fairing concept may be applied to the FIGS. 18 to 20 embodiments, as shown in FIGS. 30 and 31, in which triple primed referenced numerals indicate parts corresponding to those of FIG. 18. In the FIGS. 30, 31 embodiment internal fairings 140 are placed between the notches 82''', extending between the bullet shaped body 88''' and the nozzle 80'''. The fairings 140 are not required to guide the flow, but by confining the flow as it passes the notches 82''', the speed of the flow past the notches is increased and therefore the extent of spreading of the plumes created by the notches is decreased. However, since the internal fairings in the FIGS. 29, 30 embodiment tend to obstruct the gas flow, they will normally be used only in special applications.

The FIGS. 18 and 19 embodiment, without the bullet shaped body, may be used as an ejector or an injector pump, in which case the shroud 84 serves as a mixing duct. Normally an outwardly flared diffuser would be located at the end of the duct 84 for this application. It is found that with the wide angle notches 82 shown in FIGS. 18 and 19, the pumping capacity can be approximately doubled with the same length mixing duct or alternatively the length of the mixing duct 84 can be halved.

What we claim as our invention is:

1. In an aircraft, a lift and/or propulsion system for said aircraft, said system comprising: supply means for supplying pressurized gas, a nozzle connected with said supply means for receiving said gas and producing a jet stream, said nozzle having a nozzle exit surface having a rear edge, said rear edge having a plurality of notches formed therein and spaced along said rear edge for spreading said jet stream while directing said jet stream rearwardly of said nozzle, each notch having a narrow front apex and a rear opening substantially wider than said apex and each notch widening substantially smoothly and progressively from its apex to its rear opening, each said notch having sides which at least over a major portion of their length diverge from each other at an angle which is at least 60 degrees, said rear edge having a narrow elongated slot therein, said notches being located in at least one side of said slot.

2. In an aircraft, a lift and/or propulsion system for said aircraft, said system comprising:
   (a) supply means for supplying a pressurized gas,
   (b) a nozzle connected with said supply means and having a nozzle exit surface having a rear edge for directing said gas rearwardly of said nozzle to produce a jet stream,
   (c) at least one flap connected with said nozzle and located adjacent said exit opening for said jet stream to travel thereover,
   (d) said rear edge of said nozzle having a plurality of notches therein, each notch having a narrow front apex and a rear opening substantially wider than said apex and each notch widening substantially smoothly and progressively from its apex to its rear opening, each said notch having sides which at least over a major portion of their length diverge from each other at an angle of at least 60 degrees, said notches serving to spread said jet stream while directing said jet stream rearwardly of said nozzle and over said flap.

3. In an aircraft a lift and/or propulsion system for said aircraft, said system comprising:
   (a) supply means for supplying a pressurized gas,
   (b) a nozzle connected with said supply means and having a nozzle exit surface having a rear edge for directing said as rearwardly of said nozzle to produce a jet stream,
   (c) a diffuser connected with said nozzle and located adjacent said exit surface, said diffuser having a throat positioned to receive said jet stream and having an exit opening, said diffuser also having an entrance opening adjacent said nozzle for admission of gas to be entrained in said jet stream,
   (d) said rear edge of said nozzle having a plurality of notches therein, each notch having a narrow front apex and a rear opening substantially wider than said apex and each notch widening substantially smoothly and progressively from its apex to its rear opening, each said notch having sides which at least over a major portion of their length diverge from each other at an angle of at least 60 degrees, said notches serving to spread said jet stream within said throat while directing said jet stream rearwardly of said nozzle.

4. A system according to claim 2 or 3 wherein said rear edge is substantially closed except for said notches.

5. A system according to claim 2 or 3 wherein said rear edge is elongated laterally, said notches being spaced laterally along said rear edge.

6. A system according to claim 2 or 3 wherein said rear edge has a narrow elongated slot therein, said notches being located in at least one side of said slot.

7. A system according to claim 2 or 3 wherein said nozzle exit surface is cylindrical and said rear edge is circular and said notches are spaced circumferentially around said rear edge.

8. A system according to claim 2 or 3 wherein said angle is between 90 degrees and 145 degrees.

9. A system according to claim 2 or 3 wherein said angle is between 90 degrees and 120 degrees.

10. A system according to claim 2 or 3 wherein said angle is approximately 100 degrees.

11. Apparatus according to claim 2 or 3 including fairing means adjacent said rear edge separating said notches from each other for guiding said gas from said supply means to said notches and for confining the flow of gas to said notches.

12. An aircraft propulsion system comprising:
   (a) an engine for producing a jet stream, said engine having a nozzle having a cylindrical exit surface having a rear edge for directing said jet stream rearwardly of said nozzle,
   (b) said rear edge of said nozzle having a plurality of notches therein, each notch having a narrow front apex and a rear opening substantially wider than said apex and each notch widening substantially smoothly and progressively from its apex to its rear opening, each said notch having sides which at least over a major portion of their length diverge from each other at an angle of at least 60 degrees, said notches serving to spread said jet stream while directing said jet stream rearwardly of said nozzle.

13. In an aircraft, a lift and/or propulsion system for said aircraft, said system including a nozzle system and said nozzle system comprising: nozzle structure having a rear edge, a plurality of nozzles spaced along said rear edge, each nozzle having a tapered rear end and a notch in said rear end, each notch having a front apex and a rear opening at least as wide as said apex, each notch having sides which extend, without converging, from said apex to said rear opening, gas supply means within said structure for conducting pressurized gas to said nozzles for said nozzles to produce a jet stream, and fairing means within said structure separating said notches from each other, for guiding gas from said gas supply means to said notches and for confining the flow of gas to said notches, for said nozzles to spread said jet stream while presenting a low resistance to gas flowing over said nozzle structure.

14. A system according to claim 13 wherein the sides of said notches diverge from each other at an angle which is at least twenty-five degrees.

15. A system according to claim 13 wherein said nozzle structure includes a rear portion which is wedge-shaped in cross-section, said rear edge being the trailing edge of said rear portion, said notches being formed in said rear edge, said nozzles being defined by said rear portion and said fairing means.

16. A system according to claim 13 wherein said nozzle structure includes a plurality of ducts extending from said gas supply means to said rear edge, each duct having a said notch therein and said ducts constituting said nozzles, said fairing means being constituted by the walls of said ducts.

17. A system according to claim 16 wherein each notch is, as viewed from the end, of lesser width at its top and bottom than at its centre.

18. A system according to claim 13 and including at least one flap connected with said nozzle structure and located adjacent said notches for said nozzles to direct said jet stream over said flap.

19. A system according to claim 13 and including a diffuser connected with said nozzle structure, said diffuser having a throat positioned to receive said jet stream from said nozzles and having an exit opening, said diffuser also having an entrance opening adjacent said nozzles for admission of gas to be entrained in said jet stream.

20. An aircraft propulsion system comprising:
(a) an engine for producing a jet stream, said engine having a nozzle having a cylindrical nozzle exit surface having a rear edge for directing said jet stream rearwardly of said nozzle,
(b) said rear edge of said nozzle having a plurality of notches therein spaced circumferentially around said rear edge, each notch having a front apex and a rear opening wider than said apex and each notch widening substantially smoothly and progressively from its apex to its rear opening,
(c) a cylindrical body within said nozzle, and
(d) fairing means extending between said body and said nozzle between each notch to confine and squeeze the flow of gas past each notch, whereby to increase the gas velocity past each notch, said notches thus serving to spread said jet stream from said nozzle while directing said jet stream rearwardly of said nozzle and the extent of said spreading being limited by the increased gas velocity past each notch.

21. In an aircraft, a lift and/or propulsion system for said aircraft, said system comprising: supply means for supplying a jet stream, a nozzle connected with said supply means for receiving said jet stream, said nozzle having a nozzle exit surface having a rear edge, said rear edge having a plurality of notches formed therein and spaced along said rear edge for spreading said jet stream while directing said jet stream rearwardly of said nozzle, each notch having a narrow front apex and a rear opening substantially wider than said apex and each notch widening substantially smoothy and progressively from its apex to its rear opening, each said notch having sides which at least over a major portion of their length diverge from each other at an angle which is between 90 degrees and 145 degrees, said rear edge being elongated laterally, said notches being spaced laterally along said rear edge.

22. In an aircraft, a lift and/or propulsion system for said aircraft, said system comprising: supply means for supplying a jet stream, a nozzle connected with said supply means for receiving said jet stream, said nozzle having a nozzle exit surface having a rear edge, said rear edge having a plurality of notches formed therein and spaced along said rear edge for spreading said jet stream while directing said jet stream rearwardly of said nozzle, each notch having a narrow front apex and a rear opening substantially wider than said apex and each notch widening substantially smoothly and progressively from its apex to its rear opening, each said notch having sides which at least over a major portion of their length diverge from each other at an angle which is between 90 degrees and 145 degrees, said nozzle exit surface being cylindrical and said rear edge being circular, said notches being spaced circumferentially around said rear edge.

23. A system according to claim 21 or 22 wherein said angle is between 90 degrees and 120 degrees.

24. A system according to claim 21 or 22 wherein said angle is approximately 100 degrees.

* * * * *